United States Patent [19]

Macheras et al.

[11] Patent Number: 5,891,572
[45] Date of Patent: Apr. 6, 1999

[54] METHOD OF PREPARING MEMBRANES FROM BLENDS OF POLYMERS

[75] Inventors: James Timothy Macheras, Quincy; Benjamin Bikson, Brookline; Joyce Katz Nelson, Lexington, all of Mass.

[73] Assignee: Praxair Technology, Inc., Danbury, Conn.

[21] Appl. No.: 738,140

[22] Filed: Oct. 25, 1996

Related U.S. Application Data

[63] Continuation of Ser. No. 320,725, Oct. 11, 1994, Pat. No. 5,733,657.
[51] Int. Cl.$^6$ .............................. D02G 3/00; B01D 24/00; B01D 39/00; B29C 65/00
[52] U.S. Cl. ..................... 428/398; 428/394; 428/395; 428/397; 428/421; 428/422; 55/522; 55/527; 96/8; 96/10; 210/500.23; 210/500.24; 210/500.39; 264/41; 264/177.14; 264/727.17; 264/178; 264/211.14
[58] Field of Search .................................. 428/397, 398, 428/395, 394; 96/8, 10, 12, 13, 14; 55/527, 528, 522, 524; 210/500.23, 500.24, 500.39; 264/41, 177.17, 211.14, 128 F

[56] References Cited

U.S. PATENT DOCUMENTS

| | | | |
|---|---|---|---|
| 4,832,713 | 5/1989 | Yamada et al. | 210/500.39 |
| 5,061,298 | 10/1991 | Burgoyne, Jr. et al. | 55/16 |
| 5,076,935 | 12/1991 | Kraus et al. | 210/651 |
| 5,181,940 | 1/1993 | Bikson et al. | 55/16 |
| 5,340,480 | 8/1994 | Kawata et al. | 210/500.23 |
| 5,356,459 | 10/1994 | Bikson et al. | 95/54 |
| 5,443,728 | 8/1995 | Macheras et al. | 210/500 |

OTHER PUBLICATIONS

J.D. Le Roux et al, "Surface fluorination of poly(phenylemoxide) composite membranes Part II. Characterization of fluroinated layer," Jour. Membrane Science V. 90 1994, pp. 37–53.

J.D. Le Roux et al, "Modification of asymmetric polysulfono membranes bymild surface fluorination Part II. Characterization of the fluorinated surface." Jour. Membrane Sciences. V. 94, 1994, pp. 143–162.

*Primary Examiner*—Wiiliam Krynski
*Assistant Examiner*—J. M. Gray
*Attorney, Agent, or Firm*—Robert J. Follett

[57] ABSTRACT

Improved anisotropic fluid separation membranes are prepared from blends of polymers with surface energy differences. The membranes are formulated by processes wherein low surface energy polymer with desirable fluid separation and permeation characteristics is preferentially concentrated in the surface discriminating layer of the membrane.

20 Claims, No Drawings

METHOD OF PREPARING MEMBRANES FROM BLENDS OF POLYMERS

This application is a Continuation of prior U.S. application Ser. No. 08/320,725 Filing Date Oct. 11, 1994, now U.S. Pat. No. 5,733,657.

FIELD OF THE INVENTION

This invention describes improved anisotropic fluid separation membranes and a method of producing these membranes from solutions containing blends of polymers. The anisotropic membranes of this invention are particularly useful for gas separations.

BACKGROUND OF THE INVENTION

Processes for making synthetic polymeric membranes, including hollow fiber gas separation membranes, are well documented in the art. Separation/permeation characteristics of membranes are optimized with respect to intended end use. Consequently, consideration must be given to materials and manufacturing methods to be employed in membrane manufacturing.

A superior membrane must have a good balance of chemical, mechanical, and separation characteristics in order to function properly. It is often not possible, however, to obtain high performance in all aspects of membrane properties from a single material. Thus, a method to decouple the membrane separation/permeation characteristics from the bulk mechanical properties is frequently needed.

One method extensively employed in the art to decouple mechanical properties from membrane separation characteristics is via the composite membrane approach, wherein a thin separation layer is deposited by a solution coating method on a preformed substrate. Preparation of such membranes is described in U.S. Pat. Nos. 4,243,701; 4,826,599 and 4,840,819.

Another method that accomplishes this goal is coextrusion. Two distinctly different polymer solutions are coextruded simultaneously to form a bilayer hollow fiber. The technique permits the active sheath layer to be formed from a polymer with superior separation/permeation characteristics while the core layer that makes up the majority of membrane mass is formed from a common polymer with good mechanical and thermal characteristics. Examples of this method are taught by Ekiner et al. in U.S. Pat. No. 5,085,676 and by Kusuki et al. in Japanese Patent Application No. Sho 62-253785.

Yet another method used to optimize membrane properties employs casting solutions containing blends of two or more polymers. There are numerous examples in the art of fluid separation membranes advantageously prepared from blends of polymers. Kraus et al. in U.S. Pat. No. 5,076,935 teach the use of polyethersulfone/phenoxy resin blends to make porous isotropic membranes. Nunes et al. describe preparation of asymmetric membranes useful for ultrafiltration from blends of polyvinylidene fluoride and poly(methyl methacrylate) in the Journal of Membrane Science, 73(1992), 25–35. The practice of blending polymers also has been used effectively in the preparation of gas separation membranes. Yamada et al. in U.S. Pat. No. 4,832,713 disclose fabrication of gas separation membranes from blends of polyetherimide mixed with materials such as polycarbonates or polysulfones. Kohn et al. in U.S. Pat. No. 5,055,116 utilize miscible blends of polyimides of specific chemical compositions to prepare gas separation membranes. Burgoyne, Jr. et al. in U.S. Pat. No. 5,061,298 also describe preparation of membranes from specific polyimide blends.

Each of the aforementioned methods of membrane preparation, however, has some limitations. Coextrusion is a relatively complicated process because of the need for costly, specialized hardware such as dual-annulus spinnerettes and the need to formulate two spinning dopes in order to prepare a hollow fiber membrane. Preparation of composite membranes by solution coating methods is a two-step process wherein selection of the coating separation material is frequently limited by the solvent resistance characteristics of the substrate. Polymer blending techniques have been optimized around polymers with specific chemical structures. Polymers frequently have to be thermodynamically compatible, i.e. miscible, in order to form superior membranes. Thus there still exists a need for a simple, efficient method of manufacturing membranes with improved combination of mechanical and separation properties.

SUMMARY OF THE INVENTION

In one embodiment, the invention provides an anisotropic fluid separation membrane comprised of a blend of two or more polymers wherein at least one low surface energy polymer that comprises less than 20 percent by weight of the overall membrane material is preferentially concentrated in the surface discriminating layer of said fluid separation membrane.

In another embodiment, the invention provides an anisotropic gas separation hollow fiber membrane having a surface discriminating layer less than 1000 Å in thickness, said membrane being prepared by a process comprising the steps of:

a) forming a mixture of solvent and two or more polymers, wherein at least one of said polymers is a low surface energy polymer having a surface energy at least 10% less than at least one other polymer of said mixture and wherein said low surface energy polymer comprises less than 20% by weight of the overall polymer composition;

b) extruding the polymer-solvent mixture in the form of a hollow fiber through a gaseous atmosphere and then into a liquid medium wherein said fiber solidifies;

c) washing the solidified hollow fiber; and d) recovering the solidified highly anisotropic hollow fiber.

In another embodiment, the invention provides an anisotropic fluid separation membrane comprising a blend of two or more polymers wherein the concentration of at least one polymeric component in a surface discriminating layer of said anisotropic fluid separation membrane is made higher than the bulk concentration of said component in the blend membrane by annealing said fluid separation membrane at an elevated temperature of from 20° C. to 1° C. less than the glass transition temperature of the bulk polymer component, said preferentially concentrated component comprising less than 20 percent by weight of the overall membrane composition.

DETAILED DESCRIPTION OF THE INVENTION

It has been found surprisingly that improved anisotropic fluid separation membranes can be formed in a single-step process from a casting solution of polymer blends wherein the polymeric ingredients of this casting solution are preselected as to have significant surface energy differences. By selecting polymers with differences in surface energies, it is possible to form, in a single step, anisotropic fluid separation membranes wherein the membrane surface layer is enriched with respect to the low surface energy polymeric component. A system of two polymers can be chosen such that one of the materials will form a disproportionately high concentration of the membrane surface layer composition even though comprising a lesser fraction of casting solution composition. By further selecting a low surface energy polymeric component with separation/permeation or chemical structure beneficial for a particular fluid separation application, especially at the surface layer, it is possible to obtain improved separation membranes.

Membranes of this invention are cast from an appropriate polymer blend solution by dry/wet phase inversion processes. The process can be used to produce membranes in any desired configuration such as flat sheet, tubular or spiral wound configuration, but it is preferred to form membranes of this invention in the form of hollow fibers.

The blend membranes of the prior art are typically made of polymers that are miscible in a common membrane forming solvent system and frequently are further mutually miscible. It is not necessary for the purposes of this invention for membrane forming polymers to be truly miscible. The use of a spin dope that is homogeneous in nature at the time of spinning is sufficient to form membranes according to this invention. Appropriately formulated spin dopes of this invention will contain ingredients that will maintain stability of the spinning dope for an extended period of time as a result of high viscosity and chemical interactions.

This invention can thus be used to produce membranes with improved properties from casting solutions that contain polymers with significant differences in surface energy characteristics wherein the casting solution will contain a low surface energy polymer in a small amount relative to the amount of the high surface energy polymer. Since a solution will tend to minimize its surface energy, the migration of the lower surface energy polymer to the surface of the solution is thermodynamically favorable. The low surface energy material is consequently expected to enrich the surface of the membrane forming solution prior to coagulation. The phase change that takes place during coagulation serves to fix the low surface energy polymer at the membrane surface at a level disproportionately higher than its bulk concentration in the membrane.

Surface energy of polymers is usually ascertained by measuring polymer surface tension. Methods of determining the surface tension, (e.g. surface energy) of solids are well known in the art. Examples of such methods include measuring contact angle between the solid and different liquids, measurement of Zisman's critical surface tension and extrapolation of surface tension data of polymer melts to room temperature. Descriptions of these methods can be found in D. W. Van Krevelen, Properties of Polymers, Elsevier, 1976; R. J. Good, Surface and Colloid Science, 11 (1979), pp.1–29; D. K. Owens and R. C. Wendt, Journal of Applied Polymer Science, 13 (1969), pp.1741–1747; and D. H. Kaelble, Polymer Engineering and Science, 17 (1977), pp. 474–477. The measured surface energy, i.e. surface tension, is defined herein as measured by any of the methods described above. The surface energy of individual polymeric components that form the membrane thus can be measured to determine their respective values. By the term low surface energy polymer, it is meant that the measured surface energy of this polymer is at least 10 percent lower than the measured surface energy of the remaining polymers of the blend, the latter polymers comprising the bulk of the membrane composition. A difference in the surface energies of the membrane forming polymers of about 10% can cause a significant concentration of the low surface energy polymer in the surface of the anisotropic membrane. A difference of about 20% is preferable and a difference of 40% or more is most preferable. This low surface energy polymeric component can decrease the surface energy of the blend by as much as 2 dynes/cm, preferably by 5 dynes/cm or more. The significant decrease in the surface energy of the membranes is the primary reason for the preferential concentration of this minor polymeric component in the anisotropic surface layer. Preferential concentration of the low surface energy component in the surface discriminating layer can be directly confirmed by surface analysis methods such as ATR-FTIR (Attenuated Reflectance Fourier Transform Infrared Spectroscopy), ESCA, SIMS, and ISS among others. It is also possible to confirm that the low surface energy polymer is concentrated in the membrane surface layer indirectly by surface energy measurements. The surface energy of the membrane should be lowered substantially by incorporation of the low surface energy polymer into the blend. The measured values should be close to the surface energy value of the low surface energy component and should not exceed this value by more than 20 percent of the difference between the surface energy values of the low surface energy component and the sum of the other polymeric components of the blend. The concentration of the polymer (in weight percent) that lowers the surface energy of the blend and preferentially concentrates in the surface discriminating layer to the bulk high surface energy polymer, or polymers, is typically less than 20 percent, preferably less than 10 percent, and most preferably from 5 to 0.5 percent. In some embodiments the concentration may be as low as 0.25 percent or less. Despite the low bulk concentration of the low surface energy polymer in the blend, its concentration in the surface discriminating layer is much higher than the bulk and can be above 20 percent or preferably above 50 percent of the composition of the surface discriminating layer (e.g. the outer 1000 Å).

It is understood that the polymer blend composition can be comprised of more than two polymeric ingredients, as long as at least one polymeric component that constitutes a minor fraction of the overall polymeric composition exhibits the characteristic of significantly decreasing the overall surface energy of the blend. There may he cases when more than two polymeric components are incorporated into the polymeric blend. This may include more than one low surface energy polymeric component. The components may form mutually miscible or immiscible blends. The blends can further include two or more high surface energy components that form the bulk of the membrane structure. These components can also form mutually miscible or immiscible blends. The fact that minor amounts of the low surface energy polymer in the casting solution can be used according to the method of this invention to modify an anisotropic membrane surface layer offers a distinct advantage over processes described in the prior art. It is now possible to decouple the characteristics of the active membrane surface from the properties of the membrane substructure. This can be accomplished by formulating the casting dope with two polymers having sufficient surface energy differences. The low surface energy polymer can be used to control the permeation and separation characteristics of the membrane because the material is preferentially concentrated in the discriminating layer, while the high surface energy polymer material can be used to impart desirable characteristics such as mechanical strength to the substructure of the membrane. It will be apparent to one skilled in the art that more expensive, designer polymers can now be employed to control the surface characteristics of membranes in an economical manner.

In order to produce a hollow fiber membrane through a phase inversion process, it is necessary to properly formulate a spinning solution or dope from which the fiber is formed. The spin dope is typically a high viscosity, homogeneous mixture of membrane forming polymer, solvents, and various additives. Each of the ingredients of the spin dope can influence the spinnability of the dope and subsequently the final properties of the resulting membranes. Methods to formulate solutions or dopes for spinning hollow fibers are well known to those skilled in the art. The principles that apply toward design of a membrane forming solution utilizing a single polymer apply to formulation of polymer blend solutions as well.

In a preferred embodiment of this invention the membranes are spun into hollow fiber configuration by the process described by Bikson et al. in U.S. Pat. No. 5,181,940. This patent teaches a method of producing highly anisotropic hollow fibers useful as permselective gas separation membranes and as substrates for preparation of composite membranes by extruding a spinning solution through a tube-in-orifice spinnerette into a gas filled chamber maintained at reduced pressure followed by coagulation and solidification step. Spinning solutions formulated from blends of polymers with different surface energies can be advantageously spun into hollow fibers utilizing this spinning method. It has been found that only minor amounts of polymer that lower the surface energy of the blend in the spinning solution formulation are required to produce hollow fiber membranes with substantially improved fluid separation characteristics.

The distinguishing feature of blend membranes of the present invention is the fact that they are anisotropic and contain an integral discriminating layer frequently referred in the art as the skin. This layer can be less than 1000 Å thick, preferably less than 500 Å thick, most preferably less than 250 Å thick. The discriminating layer is distinguishable from the main membrane body by somewhat decreased porosity, i.e. increased density and/or somewhat decreased pore diameter. The porosity of the discriminating layer (porosity is defined as the ratio of the area occupied by pores to the total area of the discriminating layer) will vary from about high $10^{-2}$ range to below $10^{-5}$–$10^{-6}$. Low porosity is most desirable for integral asymmetric membranes, in particular integral asymmetric gas separation membranes, while high levels of surface porosity are particularly useful for preparation of composite membranes. The discriminating layer is typically located at the exterior membrane surface. The hollow fiber membranes may contain the discriminating layer at the exterior or the interior wall.

The additional distinguishing feature of the blend membranes of the present invention is the fact that the composition of the membrane is substantially different throughout its structure, i.e. the surface composition differs from the bulk composition.

The membranes of this invention are highly anisotropic and can be prepared with very thin discriminating layers preferably less than 250 Å thick. Discriminating layer thicknesses of these magnitudes can be advantageously achieved by the aforementioned vacuum spinning technique. The hollow fiber wall morphology and the thickness of membrane discriminating layer can be further modified through the use of coagulants that may include such solvents as alcohols and solvent/nonsolvent mixtures. However, the most often used coagulant is water or mixtures of water with solvents, surfactants and salts.

The anisotropic membrane prepared by the phase inversion method can be further treated by solvent exchange techniques well known in the art to impart improved characteristics to the anisotropic surface layer. The surface discriminating layer of the blend membranes of this invention can be further modified by high temperature annealing techniques. The method described in U.S. Pat. No. 4,881,954 is particularly useful in modifying the surface characteristics of the blend membranes of this invention. The method provides for high temperature annealing of the anisotropic membrane of this invention at temperatures slightly below the glass transition temperature of the polymeric component that comprises the bulk of membrane composition, frequently from 20° C. to about 1° C. less than the glass transition temperature of the bulk polymeric component. The annealing temperature can be lower or preferably higher than the glass transition temperature of the minor polymeric component of the blend that decreases the overall surface energy of the blend. Enrichment of the anisotropic membrane layer with the minor component thus may take place during the high temperature annealing process. In certain embodiments of this invention wherein the polymeric blend components are miscible and the surface energy differences between the components are small, the high temperature annealing step may be required to induce significant enrichment of the surface discriminating layer by the minor component of the blend that decreases the overall surface energy of the membrane.

The anisotropic membranes of this invention are uniquely suited for preparation of composite and multicomponent gas separation membranes. These membranes can be advantageously prepared by solution coating methods. Examples of such methods are shown in U.S. Pat. Nos. 5,076,916; 4,840,819; 4,826,599; 4,756,932 and 4,467,001. The coating is deposited onto the discriminating layer of the membrane and in some embodiments can partially or completely occlude the pores. The coating material, the coating morphology and coating thicknesses can be selected by those skilled in the art to meet the needs of specific gas separation applications. Dense ultra-thin coatings as thin as 500 Å or less can be successfully formed on the surfaces of the blend membranes of this invention by solution deposition methods. A broad range of solvents can be utilized in the preparation of coated membranes. The coating solvent selection is governed by coating film forming requirements and substrate solvent resistance characteristics.

In one embodiment of this invention high surface porosity hollow fibers (i.e. hollow fibers with high discriminating layer porosity) are advantageously produced from blends of polymers with significant surface energy differences Such membranes can be utilized directly in fluid separation applications such as ultrafiltration or as substrates for manufacturing of composite fluid separation membranes. In one embodiment hollow s fibers are coated with high gas permeability materials. These coated membranes may be useful for gas and vapor separation applications such as oxygen enrichment or organic vapor removal from air. Coating materials that can he advantageously employed to prepare composite membranes of this type include siloxanes such as poly(dimethylsiloxane), polybutadiene and ethylene-propylene-diene monomer (EPDM) rubbers and the like. In another embodiment, it may be desirable to coat the high surface porosity hollow fibers with a high gas separation factor glassy polymer, which to a large extent determines the gas separation characteristics of the composite membrane. Examples of such materials include sulfonated polyarylethers, sulfonated poly(phenylene oxides), polyesters, polyestercarbonates, and cellulosic derivative polymers such as cellulose acetate and blends of cellulose acetate with poly (methyl methacrylate) to name a few. Detailed description of chemical structure and preparation methods for some of these materials can be found in U.S. Pat. Nos. 5,071,498; 5,055,114; 4,994,095; 4,971,695; 4,919,865; and 4,874,401. These composite membranes are most suitable for air separation applications, acid gas separations, or hydrogen/methane separations. Composite membranes such as these can occasionally have minor defects that can he further repaired by post-treatment methods with solvents, dilute solutions of polymers and reactive additives. Post-treatment procedures of this type are taught by Bikson et al. in U.S. Pat. Nos. 4,767,422 and 5,131,927.

In another embodiment of this invention low discriminating layer porosity hollow fiber membranes are produced from polymer blends of this invention. Such membranes can be utilized directly for fluid separations or further coated prior to use. In some embodiments such as gas separation applications, the dry-wet spun hollow fiber membranes are dried prior to use by air drying or other prior art processes. For example, membranes spun into water baths can be dehydrated by methods shown in U.S. Pat. Nos. 4,080,743 and 4,120,098. In another embodiment it may be desirable to overcoat these membranes with a high gas permeability material such as silicone rubber to repair residual defects in the membrane separation layer prior to use. High gas permeability, low separation factor elastomeric coatings are frequently used to repair minor defects that occur in highly asymmetric low surface porosity membranes. Preparation of such multicomponent gas separation membranes is described in U.S. Pat. No. 4,230,463. In other cases, it may be advantageous to coat these low surface porosity hollow fibers with high gas separation factor materials that contribute to the overall gas separation characteristics of the composite membrane. These high gas separation factor materials are frequently glassy polymers. Representative examples of such polymers include polyesters, polyestercarbonates, sulfonated polysulfones and sulfonated poly(phenylene oxides), cellulosic derivative polymers, such as cellulose acetate or blends of cellulose acetate with poly(methyl methacrylate) to name a few. Coating of these glassy polymers onto low surface porosity hollow fibers often yields an essentially defect-free composite gas separation membrane with an attractive combination of permeation and separation characteristics.

Polymers that lower the surface energy of the anisotropic membrane layer and are particularly useful as additives in blend membranes of this invention include polymers containing siloxane groups, in particular dimethylsiloxane groups, and perfluorohydrocarbon groups, in particular $CF_3$ and $CF_2$ groups. In particular, useful polymers are block and graft copolymers that contain poly(dimethylsiloxane) segments. Low surface energy polymers include rigid backbone and flexible backbone polymers, including some copolymers comprised of alternating rigid and flexible segments. Examples of low surface energy polymers useful for preparation of gas separation membranes are polyimides, including polyetherimides, polyesters, polycarbonates and polyestercarbonates that contain low surface energy groups/segments.

The high surface energy polymers than can be advantageously utilized in the blends of the present invention include polysulfones, such as polyarylether sulfones and polyether sulfones; polyesters; polyimides, including polyetherimides; polycarbonates; cellulosic derivative polymers, such as cellulose acetate, polyamides, polyimideamides and polybenzimidazoles.

In a specific embodiment of this invention, gas separation membranes have been fabricated from two commercially available polymers sold under the trade names of ULTEM® 1000 and SILTEM® D9000. Both materials are manufactured by General Electric Plastics Co. The former material is a polyetherimide and the latter material is described by the manufacturer as a siloxane polyetherimide copolymer. The siloxane polyetherimide copolymer has substantially higher gas permeability coefficients than the polyether imide polymer. For example, the oxygen permeability coefficient of SILTEM is 15.4 Barrer at 30° C., which is approximately 40 times higher than that of ULTEM; however, this high gas permeability is combined with somewhat lower gas separation characteristics. Membranes prepared from this material would thus be advantageous in applications requiring high gas permeation rates. The tensile strength of SILTEM polymer, however, is only about 4100 psi. These properties may not be adequate for preparation of asymmetric gas separation membranes by conventional processes. However, anisotropic membranes can be prepared from blends of ULTEM and SILTEM according to methods of this invention wherein these membranes exhibit advantageous gas permeation properties combined with required mechanical strength.

This invention permits the use of such materials because the integrity of the resulting membrane comes from a high strength material such as polyetherimide polymer. This polymer can constitute the vast majority, for example up to 99.5%, of the membrane mass. A very small amount, as little as 0.5% of the overall membrane mass, of a secondary polymer like Siltem, is needed to impart beneficial properties to the anisotropic membrane. Only small amounts of this low surface energy polymer are required because this material will be preferentially concentrated in the anisotropic membrane layer during the casting process for the reasons expressed above. The SILTEM polymer has a lower surface energy (16.7 dynes/cm) than the ULTEM polymer (41.1 dynes/cm) that comprises the bulk of the membrane structure.

To demonstrate the reduction in the surface energy of polymer blends that occurs on incorporation of Siltem polymer, the surface energy of ULTEM/SILTEM blends, as well as its respective polymer components, was determined by measuring dynamic contact angles. The results are summarized in Table 1. it is apparent from the data in Table 1 that incorporation of even small amounts of SILTEM reduces the total surface energy $\gamma_t$ of the blends to the surface energy levels that are comparable to that of pure SILTEM polymer.

TABLE 1

| Specimen | Surface Energy $Y_t$ dynes/cm |
|---|---|
| Ultem | 41.1 |
| Siltem | 16.7 |
| Ultem/Siltem blend, 9/1 ratio | 17.8 |
| Ultem/Siltem blend, 166/1 ratio | 18.8 |

To demonstrate the preferential concentration of SILTEM polymer at the surfaces of membranes cast from SILTEM/ULTEM blends, a film was cast from the solution composed of 9 parts of ULTEM polymer, 1 part of SILTEM polymer and 90 parts of N-methyl pyrrolidone. The film was dried extensively and the atomic surface composition determined by ESCA analysis. The results are summarized in Table 2 together with the atomic compositions of ULTEM and SILTEM polymers. The results indicate that the surface of the film cast from the blend of SILTEM and ULTEM polymers, wherein SILTEM polymer comprises only a minor fraction of the overall blend composition, is composed essentially of Siltem polymer only.

TABLE 2

Atomic composition of polyetherimide, siloxane polyetherimide copolymer, and the surface composition of their blend

| Specimen | % Si | % C | % N | % O |
| --- | --- | --- | --- | --- |
| Ultem/Siltem blend 9/1 ratio | 12.5 | 65.5 | 2.2 | 19.8 |
| Ultem resin | trace amount | 82.5 | 4.3 | 13 |
| Siltem resin | 13 | 64.8 | 2.2 | 19.2 |

This invention makes it possible to improve membrane performance characteristics by incorporating an appropriate low surface energy polymer having separation properties desirable of a surface polymer into the casting solution. Since this polymer needs to be present in only minor amounts, a cost effective and simple method of controlling properties of an anisotropic membrane without compromise of its structural integrity is now available. Moreover, concentration of the preferred surface polymer at the surface occurs without the necessity or cost of coextrusion techniques.

The following examples serve to illustrate further the utility of this invention in the preparation of gas separation membranes from ULTEM/SILTEM blends but are not intended to be limiting.

EXAMPLE 1

A spinning dope consisting of 38.26 parts of ULTEM 1000 polyetherimide resin, 0.24 parts of SILTEM D9000 siloxane polyetherimide copolymer, 15.0 parts of Triton® X100, and 46.5 parts of N-methyl pyrrolidone was spun into hollow fibers. The spin dope was pumped through a tube-in-orifice spinnerette having an orifice diameter of 0.1016 cm and an injection tube outside diameter of 0.0508 cm at a rate of 3.0 cc/min and at a temperature of 71° C. Simultaneously, a core fluid of gamma-butyrolactone was delivered to the core of the injection tube at a rate of 1.2 cc/min to produce a hollow filament stream. The spinnerette was completely enclosed in a vacuum chamber in which the vacuum level was 14 cmHg.

The hollow filament stream travelled through the vacuum chamber for a distance of 2.5 cm, whereupon it entered the top of a coagulation column and was then drawn at a speed of 31.7 meters/min through a quench bath that consisted of 0.05% solution of Triton® X100 in water maintained at 45° C.

The resulting asymmetric hollow fiber had an outside diameter of about 0.038 cm and an inside diameter of about 0.02 cm. The fibers were washed to remove residual solvent components, dried, and coated with a 6% solution of poly (dimethylsiloxane) in cyclohexane.

The coated fibers were heated to remove the cyclohexane solvent and then fabricated into modules containing 8 hollow fibers about 40.5 cm long. The membranes were tested for air separation characteristics at a pressure of 7.03 Kg/cm and about 23° C.

EXAMPLE 2

Membranes were prepared and tested in a manner identical to that described in Example 1 except that the membrane polymer components in the spinning dope consisted of 38.02 parts of ULTEM 1000 and 0.48 parts of SILTEM D9000.

EXAMPLE 3

Membranes were prepared and tested in a manner identical to that described in Example 1 except that the membrane polymer components in the spin dope consisted of 37.54 parts of ULTEM 1000 and 0.96 parts of SILTEM D9000.

EXAMPLE 4

Membranes were prepared and tested in a manner identical to that described in Example 1 except that the membrane polymer components in the spin cope consisted of 36.57 parts of ULTEM 1000 and 1.93 parts of SILTEM D9000.

The results of air separation testing of the membranes in Examples 1 through 4 are summarized in Table 3. These data show that the properties of hollow fibers can he controlled by varying the ratio of ULTEM to SILTEM in the spin dope, making this a useful method of preparing membranes for fluid or gas separation applications.

Comparative Example 5

A hollow fiber membrane was prepared and tested as described in Example 1 except that the polymer component of the spinning dope consisted of 38.5 parts of ULTEM 1000 only. The gas separation performance of this membrane that is not part of the present invention is listed in Table 3.

As can be seen from the results summarized in Table 3, the hollow fiber membranes prepared according to the methods of the present invention exhibit improved gas permeation characteristics.

TABLE 3

Air separation properties of coated Ultem/Siltem blend hollow fiber membranes

| Example No. | Siltem/Ultem ratio | $O_2$ P/t* x10$^{-5}$ | α $O_2/N_2$ |
| --- | --- | --- | --- |
| 1 | 0.006 | 3.75 | 2.24 |
| 2 | 0.013 | 5.39 | 2.61 |
| 3 | 0.025 | 9.48 | 2.41 |
| 4 | 0.05 | 10.03 | 2.38 |
| 5 | 0 | 1.77 | 3.06 |

*in units of cm$^3$ (STP)/cm$^2$ cmHg sec

The terms and descriptions used herein are preferred embodiments set forth by way of illustration only, and are not intended as limitations on the many variations which those skilled in the art will recognize to be possible in practicing the present invention as defined by the claims.

What is claimed is:

1. An anisotropic fluid separation membrane comprising a blend of at least two polymers, at least one of which is a low surface energy polymer having a measured surface energy that is at least 10 percent lower than the measured surface energy of the other polymers in the blend, said low surface energy polymer containing siloxane or perfluorohydrocarbon groups, and comprising less than 20 percent by weight of the overall membrane material and being concentrated in a surface discriminating layer of said fluid separation membrane.

2. The membrane of claim 1 wherein at least one low surface energy polymer comprises less than 10 percent by weight of the overall membrane material.

3. The membrane of claim 1 wherein at least one low surface energy polymer comprises less than 5 percent by weight of the overall membrane material.

4. The membrane of claim 1, wherein said low surface energy polymer lowers the overall surface energy of the membrane by more than 2 dynes/cm.

5. The membrane of claim 1 wherein the low surface energy polymer is selected from the group consisting of polyimide, polyester, polycarbonate or polyestercarbonate.

6. The membrane of claim 5 wherein said low surface energy polymer further contains dimethylsiloxane groups.

7. The membrane of claim 1 wherein said membrane is a hollow fiber membrane.

8. The membrane of claim 7 wherein said hollow fiber membrane is further coated to provide a composite coated hollow fiber membrane.

9. The anisotropic fluid separation membrane of claim 1, in which the surface discriminating layer is less than 1000 Å thick.

10. The anisotropic fluid separation membrane of claim 1, wherein the concentration by weight of said low surface energy polymer in said surface discrimination layer is at least 20%.

11. An anisotropic gas separation hollow fiber membrane comprising a blend of two or more polymers at least one of which is a low surface energy polymer having a measured surface energy that is at least 10 percent lower than the measured surface energy of the other polymers in the blend, said low surface energy polymer containing siloxane or perfluorohydrocarbon groups, and comprising less than 20 percent by weight of the overall membrane material being concentrated in a surface discriminating layer of said anisotropic hollow fiber membrane, wherein said hollow fiber membrane is prepared by a process comprising:

a) forming a mixture of said two or more polymers and at least one solvent, said low surface energy polymer having a measured surface energy that is at least 10 percent lower than the measured surface energy of the other polymers in the blend;

b) extruding said mixture, as a hollow fiber, through a gaseous atmosphere and into a liquid medium wherein said fiber solidifies; and c) recovering the solidified fiber.

12. The hollow fiber membrane of claim 11 wherein said gaseous atmosphere is maintained at a subatmospheric pressure.

13. The hollow fiber membrane of claim 12 wherein the low surface energy polymer comprises less than 5 percent by weight of the overall membrane.

14. The hollow fiber membrane of claim 11 further including a coating deposited on said surface discriminating layer.

15. The hollow fiber membrane of claim 11, in which said low surface energy polymer comprises polyimide, polyester or polycarbonate.

16. The hollow fiber membrane of claim 11 in which the bulk of the overall membrane is polyetherimide or polysulfone.

17. An anisotropic fluid separation membrane comprising a blend of two or more polymers at least one of which is a low surface energy polymer having a measured surface energy that is at least 10 percent lower than the measured surface energy of the other polymers in the blend, said low surface energy polymer containing siloxane or perfluorohydrocarbon groups, and comprising less than 20 percent by weight of the overall membrane material and being concentrated in a surface discriminating layer of said fluid separation layer wherein the concentration of said at least one low surface energy polymer in the surface discriminating layer of said anisotropic fluid separation membrane has been enhanced by subjecting said fluid separation membrane to annealing at an elevated temperature of from 20° C. to 1° C. less than the glass transition temperature of the other polymers.

18. The membrane of claim 17 wherein said elevated temperature is above the glass transition temperature of said low surface energy polymeric component.

19. The membrane of claim 18 wherein said membrane is a hollow fiber membrane.

20. The anisotropic fluid separation membrane of claim 1, wherein said membrane is a gas separation membrane.

\* \* \* \* \*

UNITED STATES PATENT AND TRADEMARK OFFICE
CERTIFICATE OF CORRECTION

PATENT NO.   : 5,891,572
DATED        : 4/06/99
INVENTOR(S) :  James Timothy Macheras, Benjamin Bikson, Joyce Katz Nelson It is certified that error appears in the above-indentified patent and that said Letters Patent is hereby corrected as shown below:

In Claims 2-5 and 7 "The membrane of claim 1" should read -- The membrane of claim 20 --.

Signed and Sealed this

Twenty-eighth Day of December, 1999

Attest:

Q. TODD DICKINSON

*Attesting Officer*    *Acting Commissioner of Patents and Trademarks*